Oct. 27, 1936.  T. SLONCZEWSKI  2,058,641
INDICATOR DEVICE
Filed July 6, 1935
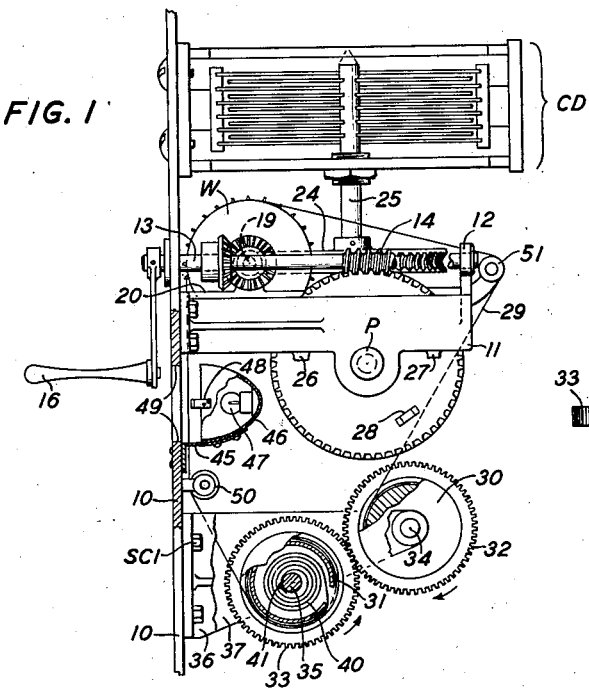
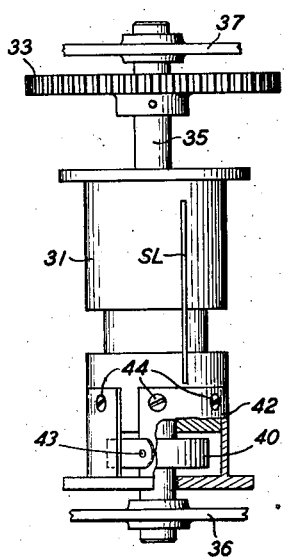
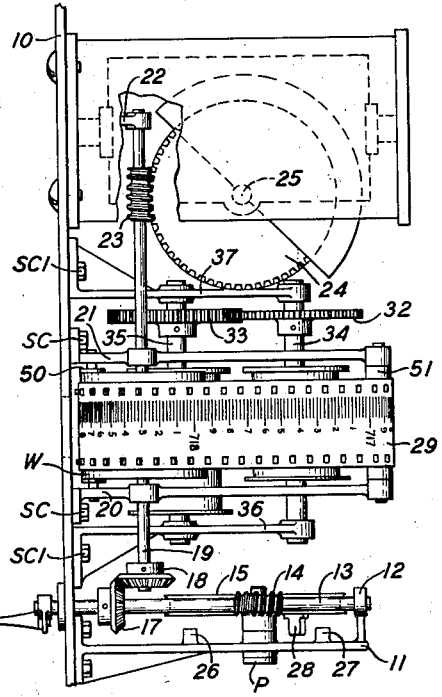
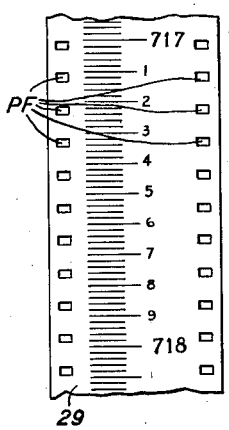
INVENTOR
T. SLONCZEWSKI
BY J. MacDonald
ATTORNEY Patented Oct. 27, 1936

2,058,641

UNITED STATES PATENT OFFICE 2,058,641

INDICATOR DEVICE

Thaddeus Slonczewski, New York, N. Y., assignor to Bell Telephone Laboratories, Incorporated, New York, N. Y., a corporation of New York Application July 6, 1935, Serial No. 30,198

4 Claims. (Cl. 116—124.1)

This invention relates to radio apparatus, and more specifically to a device for use in such apparatus for indicating the adjusted position of the tuning elements.

According to the indicator device of the invention, a film is provided with a continuous row of striations in spaced relation which correspond to predetermined adjustment of the radio tuning elements. Means in the form of a sprocket wheel operating upon the adjustment of such elements is provided, whereby the film is moved in front of an opening in the panel of the mounting of the set with one of its ends winding on a spool, while the other end unwinds from another spool through the operation of a gearing mechanism having resilient means provided for operatively connecting the two spools in a manner that the film is held under tension irrespective of the direction of the movement of the tuning elements. The use of a film together with its operating mechanism makes it possible to obtain a scale divided into fractions of a kilocycle in less space than that occupied by an ordinary disc or drum and effects greater accuracy in the setting of the tuning elements.

Other features of the invention will appear from the following description and by the claims appended thereto, reference being had to the accompanying drawing in which:

Fig. 1 is a side elevation view shown with a number of operating parts with portions cut away;

Fig. 2 is a top assembly view;

Fig. 3 is an enlarged view of one of the spools with portions cut away; and

Fig. 4 is a front view of a portion of the film with the scale printed thereon.

As shown in Figs. 1 and 2 of the drawing, 10 is a supporting plate for mounting a bracket 11 having a bearing portion 12 cooperating with a bearing portion in the plate 10 for rotatably supporting a shaft 13. This shaft is formed with a worm portion 14 engaging a worm wheel 15 for rotating it on a pivot P upon the operation of a crank 16 secured to the front end of shaft 13, the worm wheel 15 having a lug 28 laterally extending from one of its sides for engaging with stop lugs 26 and 27 formed with the bracket 11 upon the movement of worm wheel 15 for a purpose that will be hereinafter described in detail.

On shaft 13 is securely mounted an angular gear 17 disposed in engaged relation with another angular gear 18 secured on one end of a shaft 19. This shaft is journaled in brackets 20, 21 and 22, which are secured to the supporting plate 10 by a number of ordinary screws such as SC shown in Fig. 2.

On the other end of shaft 19 opposite to that of pinion 18 is mounted a worm 23 engaging with a worm wheel 24 securely mounted on the rotor shaft 25 of a condenser device CD for adjusting it upon the movement of a crank 16 within the angular distance determined by the stop lugs 26 and 27 formed with the bracket 11 when engaged by the stop lug 28 carried by the worm gear 15.

The adjusting movement of condenser element CD is indicated by a film 29 having perforations PF along its longitudinal edges for engaging the teeth of a sprocket wheel W securely mounted on the shaft 19. One end of the film passes on an idler roller 51 and is secured to a spool 30 keyed on a spindle 34 and the other end of the film from the sprocket wheel W passes on the idler roller 50 and this end of the film engages a slot SL in the spool 31 shown in enlarged view in Fig. 3. Spool 31 is loosely mounted on a spindle 35 but is operatively connected thereto through a spiral spring 40 having one end secured to spindle 35 by a pin 41 shown in Fig. 1 and its outer end to a slotted collar 42 in turn secured to the spool 31 by a number of screws such as 44. The spindles 34 and 35 of spools 30 and 31 are journaled in brackets 36 and 37 secured to the mounting plate 10 by screws SC1 shown in Figs. 1 and 2 and are operatively connected to each other by gears 32 and 33.

In the rear side of plate 10 there is securely mounted a bracket 45 provided for supporting a reflector 46 provided with a lamp 47 and a metallic strip 48 disposed to cast its shadow on the illuminated portion of the film when passing in front of the opening 49 in the plate 10. The film 29, as shown in Fig. 4, is graduated in kilocycles and fractions thereof which permits very close adjustment of the condenser CD or any other apparatus in which the indicator of this invention may be used due to the great length of film used in relation to the angular adjusting movement of the condenser.

In a typical example of operation, one end of the film 29 is coiled a maximum number of turns on the spool 31, for example, when the rotor element of condenser CD is fully engaged with its associated stator element and the stop 28 abutting against the lug 27, the other end of the film being secured and coiled a few turns on the spool 30.

Under this condition the operation of crank 16 is effective to actuate the rotor shaft 25 and to move the sprocket wheel W in a clockwise direction for moving the film 29 on the front of the light projector 46 where it may be visually observed from the opening 49 in the plate 10. The operation of the film 29 and the consequent rotating movement of spool 31 is effective to rotate its supporting spindle 35 through the tension of spiral spring 40 and the operation of spindle 35 is imparted to the spool 30 through the gears 33 and 32 for taking up the slack on the other end of the film to a point wherein the stop 28 engages with lug 26, thus preventing excessive tension or stress on the film. Similarly, upon a movement of the sprocket wheel W in a counter-clockwise direction is effective to rotate the spool 32 in the direction indicated by the arrow in Fig. 1 and thereby rotating the gear 33 and the spindle 35 for permitting the unwinding of the spiral spring 40 and the consequent rotation of the spool 31 for taking up the slack of the film at this end. In the indicator of the invention a comparative great length of film is used for a 180 degree adjustment of condenser CD and this permits the graduation of such a film in hundredths of a kilocycle or in other value when used in connection with other measuring apparatus.

It is understood that many changes may be made in this indicating device without departing from the spirit of the invention and the scope of the appended claims.

What is claimed is:

1. In a device for indicating the adjusted position of tuning elements in a radio set having a rotatable shaft, a sprocket wheel carried by said shaft, a film operatively engaging said sprocket wheel, a pair of spools for winding and unwinding the film according to the direction of the tuning elements, a row of striations on said film for indicating the adjusted position of the elements and a rotating member operating conjointly with said shaft and having means engaging with stationary means for limiting the extent of turning movement of the rotatable shaft and said film in each direction.

2. In a device for indicating the adjusted position of the tuning elements in a radio apparatus having a rotatable shaft, said device comprising a film, a sprocket wheel, a shaft for said sprocket wheel operatively connected to the first-mentioned shaft, a pair of spool members, a pair of spindles for supporting said spool members, said film having its ends secured to said spool members and operatively engaging said wheel, one of said spool members being secured to its supporting spindle and the other spindle rotatable independently of its spool member, spring means operatively connecting the last-mentioned spool to said spindle for permitting movement of said members relative to each other upon the movement of said film, a plurality of stationary stopping elements, a rotatable gear and a stopping element carried by said rotatable gear and disposed in the path of said stationary elements for limiting the movement of the rotatable shaft and said film.

3. In a device for indicating the adjusted position of tuning elements in a radio apparatus, said device comprising a film, a shaft, a sprocket wheel carried by said shaft for actuating said film, a pair of parallelly disposed spindles, a spool and a gear securely mounted on one of said spindles, a gear secured on the other of said spindles, a spool loosely mounted on the last-mentioned spindle and engaging the other gear, means in each of said spools for securing the ends of said film, yieldable means operatively connecting the last-mentioned spindle to the last-mentioned spool for permitting relative movement between each of said spools upon the operation of said film, a light projector and a pointer cooperating with said film for indicating the adjustment of said elements.

4. In a device for indicating the adjusted position of tuning elements in a radio set having an adjustable member, said device comprising a pair of spools, a film having its ends wound on said spools, a gearing mechanism operatively connecting said spools, a sprocket wheel operable for winding and unwinding said film on said spools according to the direction of movement of the adjusable member, means carried by said film for indicating the movement of the adjustable member, a second gearing mechanism for rotating said sprocket wheel, and a plurality of cooperating stopping means actuated by said second mechanism for determining the extent of movement of said film.

THADDEUS SLONCZEWSKI.